United States Patent [19]

Beckmann et al.

[11] Patent Number: 5,226,277
[45] Date of Patent: Jul. 13, 1993

[54] BODY SEAL END JOINT FASTENER

[75] Inventors: Thomas P. Beckmann, Chapel Hill, N.C.; Ronald E. Vezza, Centerville, Ohio

[73] Assignee: General Motors Corporation, Detroit, Mich.

[21] Appl. No.: 855,971

[22] Filed: Mar. 23, 1992

[51] Int. Cl.⁵ .............................................. E06B 7/23
[52] U.S. Cl. .................................. 52/717.01; 52/400; 52/716.7; 24/31 C
[58] Field of Search ................. 52/716, 717.1, 400, 52/403, 208; 49/490, 491, 492, 493, 494; 296/146 F, 146 N, 93; 24/31 C, 36, 31 R, 31 F

[56] References Cited

U.S. PATENT DOCUMENTS

| | | |
|---|---|---|
| 982,122 | 1/1911 | Brooks . |
| 1,689,691 | 10/1928 | Schaefer . |
| 1,712,565 | 5/1929 | Koroschetz . |
| 1,913,864 | 6/1933 | Walper . |
| 1,993,734 | 3/1935 | Edelheit . |
| 2,112,707 | 3/1938 | Reiter . |
| 2,232,810 | 2/1941 | Simpson et al. ........... 49/492 |
| 2,902,313 | 9/1959 | Adell ........................... 49/490 |
| 3,108,338 | 10/1963 | Stec et al. .................. 49/490 |
| 3,167,856 | 2/1965 | Zoller ........................... 49/495 |
| 3,222,769 | 12/1965 | Le Plae . |
| 3,256,577 | 6/1966 | Bright . |
| 3,279,512 | 10/1966 | Paynor . |
| 3,290,847 | 12/1966 | Fenwick ...................... 52/489 |
| 3,310,928 | 3/1967 | Weimar . |
| 3,382,619 | 5/1968 | Bemis ......................... 49/495 |
| 3,638,359 | 2/1972 | Kruschwitz ................ 52/717.1 |
| 3,756,636 | 9/1973 | Jackson ...................... 296/93 |
| 4,235,148 | 11/1980 | Menge ......................... 85/13 |
| 4,512,130 | 4/1985 | Pepin ........................... 52/404 |
| 4,512,331 | 4/1985 | Levi ............................. 49/489 |
| 4,641,474 | 2/1987 | Cannarsa ..................... 52/514 |
| 4,710,083 | 12/1987 | Wolf ........................... 411/466 |
| 4,783,117 | 11/1988 | Nagata ........................ 49/493 |
| 4,869,945 | 9/1989 | Harney ....................... 428/122 |
| 4,959,081 | 9/1990 | Mathellier ................... 49/491 |

FOREIGN PATENT DOCUMENTS

| | | | |
|---|---|---|---|
| 0151556 | 6/1988 | Japan ........................... 296/93 |
| 0645558 | 11/1950 | United Kingdom ......... 49/491 |
| 0779866 | 7/1957 | United Kingdom ......... 52/716 |

Primary Examiner—Carl D. Friedman
Assistant Examiner—Winnie Yip
Attorney, Agent, or Firm—Raymond I. Bruttomesso, Jr.

[57] ABSTRACT

A fastener joins a pair of ends of a weather-strip, where the weather-strip has a channel shaped weather-strip carrier of elastomeric material with an encapsulated U-shaped reinforcement. The spaced apart walls of the carrier are connected by a base and one of the walls of the carrier carries a bulbous weather-strip portion of the weather-strip. The fastener has a base for engaging the base of the carrier. A first wall of the fastener is formed integrally with the base and projects normally from the base for engaging one of the walls of the carrier. A second wall of the fastener is formed integrally with the base and projects normally from the base for engaging the other wall of the carrier. A pair of prongs is formed integrally with the base and projects normally from the base with each prong piercing the base of the carrier near one of the ends and each prong being bent after piercing the base for mechanically retaining the base of the carrier near the end of the carrier. The second wall of the fastener has an end which is crimped over the other wall of the carrier for retaining the other wall in engagement with the fastener whereby the fastener assembly mechanically connects the ends of the weather-strip.

3 Claims, 1 Drawing Sheet

BODY SEAL END JOINT FASTENER

BACKGROUND OF THE INVENTION Field of the Invention

This invention relates to a fastener and more particularly to a fastener that mechanically connects the ends of an extruded elastomeric automobile weather-strip carrier.

It is known in motor vehicles to provide a weather-strip for sealing around vehicle body openings such as door openings and luggage compartment openings. The weather-strip has a bulbous weather-strip seal for sealing and a U-shaped carrier. The vehicle body panels defining such openings are provided with a sheet metal flange for mounting the weather-strip carrier.

It is known that the weather-strip works most effectively when the carrier weather-strip remains in engagement with the flange and the ends of the weather-strip stay in abutting engagement with each other. U.S. Pat. No. 4,869,945 to Harney discloses a weather-strip carrier with legs to prevent disengagement of the weather-strip from the flange. It is also known to connect or secure the ends of the weather-strip to prevent the ends from walking or moving away from each other and also reduce the possibility of the weather-strip disengaging from the flange. Previous methods of joining the ends include vulcanizing the ends together and gluing a plastic clip between the ends using a hot melting process.

It would be desirable to have a fastener to mechanically join the ends of an extruded elastomeric automobile weather-strip carrier.

SUMMARY OF THE INVENTION

The invention provides a fastener for joining a pair of ends of a weather-strip, where the weather-strip has a channel shaped weather-strip carrier of elastomeric material with an encapsulated U-shaped reinforcement. The spaced apart walls of the carrier are connected by a base and one of the walls of the carrier carries a bulbous weather-strip portion of the weather-strip. The fastener has a base for engaging the base of the carrier. A first wall of the fastener is formed integrally with the base and projects normally from the base for engaging one of the walls of the carrier. A second wall of the fastener is formed integrally with the base and projects normally from the base for engaging the other wall of the carrier. A pair of prongs is formed integrally with the base and projects normally from the base with each prong piercing the base of the carrier near one of the ends and each prong being bent after piercing the base for mechanically retaining the base of the carrier near the end of the carrier. The second wall of the fastener has an end which is crimped over the other wall of the carrier for retaining the other wall in engagement with the fastener whereby the fastener mechanically connects the ends of the weather-strip.

One object, feature and advantage resides in the provision of a fastener for mechanically connecting the ends of a weather-strip by use of a pair of prongs formed integrally with a base of the fastener and projecting normally from the base with each prong piercing the weather-strip near one of the ends and being bent for mechanically retaining the weather-strip and also by a wall projecting normally from the base having an end crimped over the weather-strip for mechanically retaining the weather-strip in the fastener.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
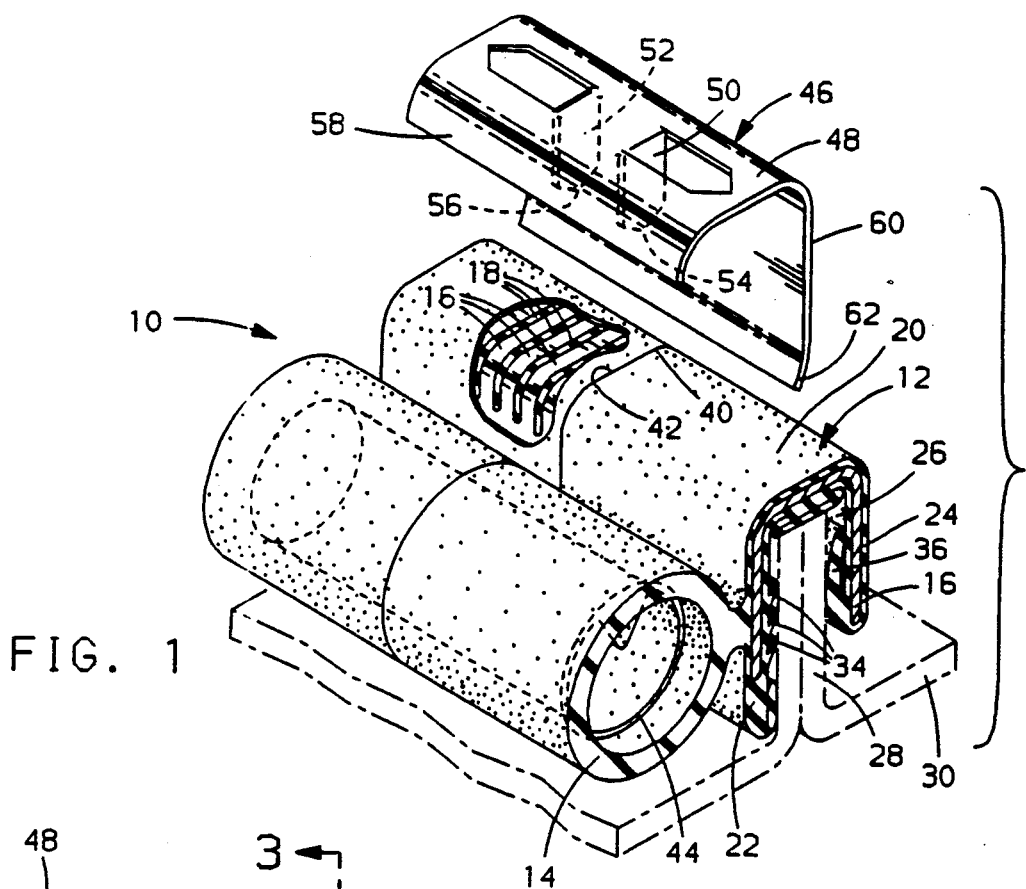
FIG. 1 is a perspective view of a broken out section of the weather-strip showing the fastener prior to its installation on the weather-strip. The body panel flange which receives the weather-strip after the fastener is installed is shown in phantom.

Referring now to FIG. 1, it is seen that a weather-strip generally indicated at 10 includes a weather-strip carrier 12 of generally channel shape and a bulbous weather-strip seal 14. The carrier 12 includes a U-shaped reinforcement 16, preferably of expanded metal, which is encapsulated in an extruded body of flexible elastomeric material such as 70 Shore A vinyl, as seen in FIG. 1. The U-shaped reinforcement 16 has a plurality of expansion gaps 18 which are filled with the flexible elastomeric material. Expanded metal reinforcements are disclosed in prior U.S. Pat. Nos. such as Weimar 3,310,928 Bright 3,256,577; and LePlae 3,222,769. The bulbous seal 14 is preferably extruded sponge rubber which is then adhesively married to the carrier 12. The bulbous seal 14 is a softer material to provide a compressive water tight sealing engagement with an adjacent closure panel, not shown.

Figure 4:
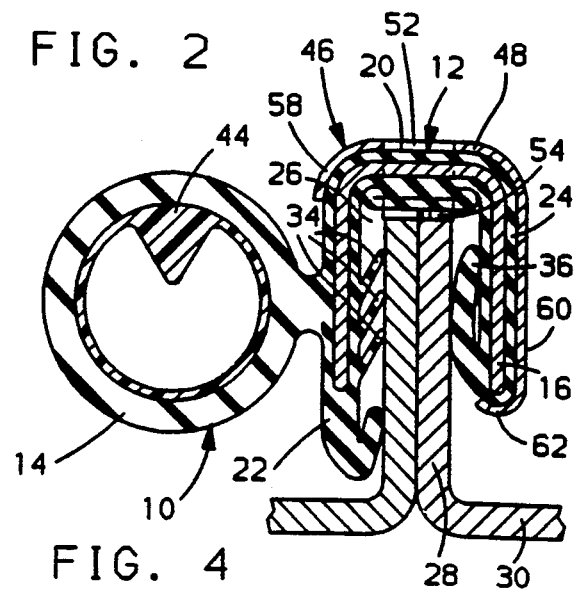
FIG. 4 is a section taken through the fastener with the carrier of the weather-strip installed.

Referring to FIG. 4, the weather-strip carrier 12 includes a base 20 and spaced apart walls 22 and 24 which cooperate to define a central opening 26 adapted to receive a sheet metal flange 28 of a vehicle body panel 30. Wall 22 carries the bulbous weather-strip 14.

Referring to FIG. 4, wall 22 of the weather-strip carrier 12 has a plurality of flexible legs 34 integral therewith and projecting into the central opening 26 angularly toward the base 20. These legs 34 are extruded integrally with the carrier 12 and extend continuously along the length of the carrier 12. The carrier 12 also includes a sealing leg 36 which is extruded integrally with the wall 24 and projects into the central opening 26 angularly toward the base 20.

Referring to FIG. 1, the weather-strip 10 is cut to a length to fit the sheet metal flange 28 around a door opening. The weather-strip 10 has a pair of ends 40 and 42 which will abut each other when the weather-strip 10 is mounted to the flange 28 in the door opening.

Referring to FIG. 4, a portion of a cylindrical plastic plug 44 maybe inserted in the bulbous weather-strip 14 of the first end 40 of the weather-strip 10 and secured in this position by cementing or by friction fit. A remaining portion of the plug is inserted and similarly secured in the bulbous weather-strip 14 of the second end 42 of the weather-strip 10 to assure alignment of the bulbous weather-strip 14, as seen in FIG. 1.

Figure 2:
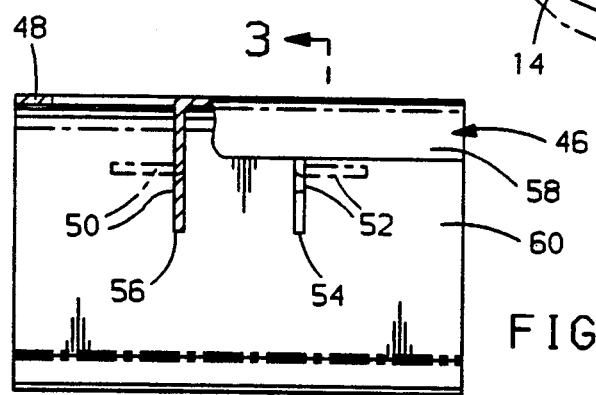
FIG. 2 is an elevational view of the fastener. The prongs are shown in the bent position in phantom.
Figure 3:
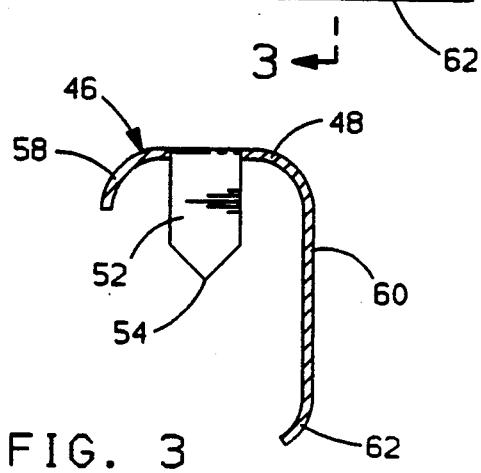
FIG. 3 is a section taken in the direction of arrows 3—3 in FIG. 2, through the fastener.

Referring to FIG. 2, a fastener 46 made of stamped steel, or other suitable material, is channel shaped, defined by a base 48 and a pair of depending walls 58 and 60. The wall 58 extends to a height to sufficiently engage the wall 22 of the weather-strip carrier 12, but not to engage or interfere with the bulbous weather-strip 14, as seen in FIG. 4. The second wall 60, of greater height than first wall 58, is parallel to the first wall 58, and has a free edge 62 which curves inward. The base 48 has a pair of prongs 50 and 52 struck from the base 48 and projecting normally from the base 48 and normal to the walls 58 and 60. Referring to FIG. 1, prongs 50 and 52 have tips 54 and 56 for penetrating the weather-strip 10 upon installation of the fastener as described below.

Referring to FIGS. 1 and 4, prior to installing the weather-strip 10 on the flange 28, the fastener 46 is pushed over the ends 40 and 42 of carrier 12 of the weather-strip 10, with the second wall 60 of the fastener 46 aligning with and sliding down along the wall 24 of the carrier 12. The tips 54 and 56 of the prongs 50 and 52 pierce the base 20 of the carrier 12 near the ends 40 and 42 for retaining the carrier 12. The prongs 50 and 52 typically pass through one of the expansion gaps 18 in the reinforcement 16. While the prongs 50 and 52 are capable of piercing the reinforcement 16 because of the differences in metal properties between the fastener 46 and the reinforcement 16, typically if a prong 50 or 52 engages the reinforcement 16, both the prong and the reinforcement will shift slightly allowing the prong to pass through the expansion gaps 18.

The first wall 58 engages the wall 22 of the carrier 12 so that the carrier 12 is captured between the two walls 58 and 60 of the fastener 46. The prongs 50 and 52 are bent over to a bent position, shown in FIG. 4 and in phantom in FIG. 2, to mechanically sandwich the base 20 of the carrier 12, including the reinforcement 16, between the base 48 of the fastener 46 and the prongs 50 and 52. The prongs 50 and 52 passing through the expansion gaps 18 and being bent over to the bent position interlocks the reinforcement 16 with the prongs 50 and 52 securing the fastener 46 to the carrier 12 of the weather-strip 10 mechanically connect the ends 40 and 42 of the weather-strip 10 thereby preventing the ends 40 and 42 from moving apart. The edge 62 of the second wall 60 is crimped over the wall 24 of the carrier 12 of the weather-strip 10 to further secure the weather-strip 10 from movement away from the base 48 and the second wall 60 of the carrier 12. The edge 62 also protects the ends 40 and 42 of the weather-strip 10. A tool, which is not shown, may be designed to automate the process of inserting the weather-strip in the fastener and bending the prongs and crimping the edge to secure the weather-strip within the fastener.

The fastener 46 is of such a length that allows the prongs 50 and 52 to be spaced sufficiently distant from the each other to ensure secure engagement with the carrier 12 near the respective ends 40 and 42 and also has enough base 48 outboard of the prongs 50 and 52 after the prongs 50 and 52 are stuck from the base 48 for integrity of the base 48.

With the two ends 40 and 42 of the carrier 12 of the weather-strip 10 mechanically connected to each other by the fastener 46 forming a continuous weather-strip assembly, the central opening 26 of the weather strip carrier 12 is placed over the sheet metal flange 28 of the vehicle body panel 30.

The use of the fastener 46 will allow repair facilities to fabricate replacement weather-strips by cutting a piece of weather-strip 10 to a required length and securing the two ends 40 and 42 together using the fastener 46. The repair facility can mechanically connect the ends 40 and 42 of the weather-strip 10 by the fastener 46 and common hand tools such as pliers.

While one embodiment of the present invention has been explained, various modifications within the spirit and scope of the following claims will be readily apparent to those skilled in the art.

The embodiments of the invention in which an exclusive property or privilege is claimed are defined as follows:

1. A continuous weather-strip assembly for mounting to a flange of a vehicle body panel comprising:

a weather-strip with a pair of ends adapted to be joined together to form a continuous loop of weather-strip, the weather-strip having a U-shaped reinforcement encapsulated in an elastomeric material to define a weather-strip carrier having a carrier base and a pair of spaced apart walls connected by the carrier base defining a channel for receiving the flange of the vehicle body panel and one of the walls carrying a bulbous weather-strip portion of the weather-strip, said U-shaped reinforcement being of metal construction and having gaps spaced therealong and extending transversely of the longitudinal axis of the weatherstrip, a fastener including a fastener base for engaging the base of the carrier, a first fastener wall formed integrally with the fastener base and projecting normally from the fastener base for engaging the one of the carrier walls which carrier the bulbous weather-strip portion, a second fastener wall formed integrally with the fastener base and projecting normally from the fastener base for engaging the other wall of the carrier, and a pair of prongs formed integrally with the fastener base and protecting normally from the fastener base and extending transversely of the longitudinal axis of the weather-strip, said prongs piercing the base of the carrier at the respective ends of the weather-strip and each prong extending through one of the gaps of the U-shaped reinforcement and being bent for mechanically joining the ends of the weather-strip and thereby forming a continuous weather-strip assembly for mounting on the flange of the vehicle body panel.

2. A continuous weather-strip assembly of claim 1 having alignment means secured within the bulbous weather-strip portion of one end and received by the bulbous weather-strip portion of the other end for aligning the bulbous weather-strip portions.

3. The continuous weather-strip assembly of claim 1 wherein the second wall of the fastener has an end crimped over the other wall of the carrier.

* * * * *